3,034,967
FLUORIDE DENTIFRICE WITH INSOLUBLE ALKALI METAL METAPHOSPHATE AND ALUMINUM COMPOUND POLISHING MATERIAL
Lester Donald Apperson, Madison, and Alexander Wayne Bouchal, Fair Lawn, N.J., assignors to Colgate-Palmolive Company, New York, N.Y., a corporation of Delaware
No Drawing. Filed May 29, 1956, Ser. No. 587,929
Claims priority, application Canada Aug. 8, 1955
12 Claims. (Cl. 167—93)

The present invention relates to a dentifrice preparation comprising a fluoride compound which releases fluoride ions in water, and a mixture of an insoluble alkali metal metaphosphate and an aluminum compound as a polishing material, said dentifrice being free from a calcium and magnesium compound which tend to diminish the effectiveness of the fluoride compound, as hereinafter described and claimed.

In accordance with the present invention, it has been found that the presence of a minor amount of an aluminum compound in a dentifrice comprising said fluoride compound and insoluble alkali metal metaphosphate and free of said calcium and magnesium compounds results in improved and unexpected physical properties of the composition. Various preferred embodiments of the present invention will be apparent in the following description.

The fluoride compound used is an inorganic fluoride salt, particularly an alkali metal or tin fluoride salt. Suitable examples are sodium fluoride, potassium fluoride, stannous fluoride, potassium stannous fluoride $(SnF_2 \cdot KF)$ and stannous chlorofluoride. In practice it has been found that particularly effective results are obtained with sodium fluoride and with stannous fluoride. Other fluoride salts which inhibit the solubility of enamel in acid and which may be employed in accordance with the present invention are sodium, potassium and stannous fluorophosphate, and the like.

The insoluble alkali metal metaphosphates are preferably the insoluble sodium and potassium salts of polymetaphosphoric acid. The forms of insoluble sodium metaphosphate known as Madrell's salt and Kurrol's salt are examples of suitable materials. These metaphosphate salts exhibit only a minute solubility in water, and are commonly referred to as insoluble metaphosphates. There is usually present a minor amount of soluble phosphate material as impurities, of the order of a few percent such as up to about 4% by weight. The amount of soluble phosphate material, which is believed to be a soluble sodium trimetaphosphate in the case of insoluble sodium metaphosphate, may be reduced by washing with water if desired.

The aluminum compound used is a water-insoluble inorganic material such as an aluminum phosphate or hydrated aluminum oxide. Representative examples of aluminum phosphate are normal aluminum orthophosphate, aluminum pyrophosphate, aluminum metaphosphate, and the like. Suitable examples of hydrated aluminum oxide which may be employed are the forms known as alpha and beta aluminum oxide trihydrate and mixtures thereof, precipitated aluminum hydroxide and alumina hydrate or alumina gel. The aluminum compound is used usually in the form of fine particles of any desired particle size. In practice, it is preferred to use the alpha trihydrate form of which at least about 90% of the particles pass through on a U.S. standard No. 325 mesh sieve and not more than about 5% of the particles by weight are less than 5 microns.

The use of the aluminum compound in admixture with the insoluble alkali metal metaphosphate and fluoride compound imparts desirable physical and chemical properties. It has been found that the aluminum compound markedly decreases any tendency of the insoluble sodium metaphosphate to attack or etch tooth enamel. The immersion of teeth in a slurry of insoluble sodium metaphosphate admixed with a minor amount of the aluminum compound, such as aluminum phosphate, for a number of days shows that this mixture does not have any significant tendency to etch tooth enamel. The mixture is an effective polishing material and results in a cleansing effect without undue abrasiveness.

The mixture of insoluble metaphosphate and the aluminum compound has been found to be highly compatible with a soluble fluoride compound. Certain known dentifrice constituents such as calcium carbonate, dicalcium phosphate and similar materials tend to diminish the effectiveness of water-soluble fluorides such as sodium fluoride. In comparison, a mixture of the aluminum compound and insoluble metaphosphate does not adversely affect the fluoride material but results in a high level of soluble fluoride in the composition.

These ingredients should be used in suitable proportions. The amount of the fluoride compound should be an effective and non-toxic amount. In general, the amount of the fluoride salt should be up to about 2% by weight, and usually within the range of about 0.05 to about 1%, by weight of the dentifrice preparation. In commercial practice, it is preferred to use about 0.2% alkali metal fluoride or about 0.4% tin fluoride in a dental cream.

The total content of polishing material is usually from about 20 to 99% by weight depending upon the specific composition. In tooth pastes the polishing material is about 20 to 75% usually whereas in tooth powders it is usually from about 70 to 95% by weight.

The insoluble metaphosphate and aluminum compound should be used in suitable proportions. In general, the insoluble metaphosphate is usually in major proportion and the aluminum compound in minor proportion in such mixtures. Effective mixtures will be found within the range of metaphosphate to the aluminum compound from about 100:1 to about 3:2 by weight, and usually about 50:1 to 4:1, depending upon the specific composition. In commercial practice, it is preferred that the dental creams comprise the insoluble metaphosphate in an amount from about 40 to 50%, and the aluminum compound in an amount from about ½ to 20%, preferably ½ to 10%, by weight.

The dentifrice should contain an organic non-soap or synthetic surface active material or detergent. Suitable detergents are the water-soluble salts of higher fatty acid monoglyceride monosulfate detergent (e.g. sodium coconut fatty acid monoglyceride monosulfate), alkyl aryl sulfonate (e.g. sodium dodecyl benzene sulfonate), higher alkyl sulfoacetate (e.g. sodium lauryl sulfoacetate), higher fatty acid esters of 1,2-dihydroxy propane sulfonate (e.g. sodium coconut fatty acid ester of 1,2-dihydroxy propane sulfonate), and the substantially saturated higher aliphatic acyl amides of lower aliphatic amino carboxylic acid compounds having 12 to 16 carbons in the acyl radical in which the amino acid portion is derived from the lower aliphatic saturated monoaminocarboxylic acids, such as the specified fatty acid amides of glycine, sarcosine, alanine, 3-aminopropanoic acid and valine. It is preferred to use the N-lauroyl, myristoyl and palmitoyl sarcoside compounds, particularly the sodium salts thereof.

These surface active materials should be used in suitable amounts, generally from about 0.05 to about 10% by weight, and preferably from about 0.5 to 5% by weight of the dentifrice preparation.

In the preparation of tooth powders, it is usually sufficient to mechanically admix the various ingredients in solid form.

In dental cream formulations, the liquid and solid ingredients should be proportioned to form a creamy gel of desired consistency which is extrudible from a collapsible tube. The polishing material is suspended in a gel comprising water, humectant and gelling agent. The use of a mixture of both water and humectant has been found desirable. Suitable examples of humectants are glycerine, sorbitol and propylene glycol. In general, the water and humectant will each be about 10 to 40% by weight of the dental cream. The presence of the aluminum compound in the dental creams permits wide variation in the type of humectant and in the proportions of water and humectant without detriment to the physical properties. There may be used relatively low amounts of humectant of the order of about 10 to 25% or relatively high proportions such as 25–40% with maintenance of the desired physical properties. For example, a dental cream having a reduced or low glycerine content usually shows a greater tendency to separation but the dental creams of the present invention exhibit good stability against separation or thickening. The gelling agent may be a natural or synthetic gum or gum-like material, e.g. Irish moss gum, gum tragacanth, sodium carboxymethylcellulose, etc., usually in an amount from about 0.1 to 5%, and preferably 0.5 to 3%, by weight of the dental cream.

An embodiment of the present invention relates to dentifrices, particularly dental creams, having a pH of about 5 to 6.5, preferably 5.2 to 6.2. Where reference is made to pH herein, it is intended that such pH determination be made on the dental cream per se and on a 20% slurry of the tooth powder in water. If necessary, acidifying agents or basic materials may be added to adjust the pH within the desired range. Where highly acidic fluoride or aluminum compounds such as stannous fluoride or aluminum phosphate are employed, the pH of the resulting cream will usually be about 5.5, though it will vary somewhat depending upon the proportions and the other ingredients. In the case of sodium fluoride and hydrated alumina or the like, the pH will ordinarily be higher and a suitable acidifying agent such as citric acid or other weak organic acid may be employed in varying amount if necessary to adjust the pH of the dental cream.

The pH of the dental cream is an important consideration. It is believed that the indicated pH range of the dental cream is the most practicable for use. It has been found that fluoride-containing creams with the insoluble metaphosphate as the sole polishing material possess a marked tendency to separate within this pH range. In general, the aluminum compound produces an equilibrium in the dental cream which renders the system more stable against adverse chemical and/or physical reactions, and particularly against separation.

These dental creams of the present invention exhibit a superior degree of stability to aging for long periods of time, particularly at elevated temperatures. The aluminum compound acts as a stabilizing and modifying agent so as to eliminate or inhibit any tendency for separation or "bleeding" of the dental cream in the collapsible tubes. As a consequence, the dental cream is extrudible from the tube as a stable, smooth and homogeneous paste having a uniform body and consistency even after aging for long periods of time. The resulting dental cream exhibits an improved stability of the system with respect to the pH of the product and the fluoride compound is maintained in active ionic form whereby the beneficial activity of the fluoride for the protection of the teeth against tooth decay is maintained at an optimum.

Various other materials may be incorporated in the dentifrice composition. Examples are small amounts of soluble saccharin, flavoring oils, coloring or whitening agents, preservatives, emulsifying agents, silicones, and the like.

The following specific examples are further illustrative of the nature of the present invention and it will be understood that the invention is not limited thereto. The compositions are prepared in the usual manner and all specified amounts are in percent by weight.

*Examples I–VI.—Dental Creams*

| Ingredients | I | II | III | IV | V | VI |
|---|---|---|---|---|---|---|
| Sodium fluoride | 0.2 | 0.2 | | 0.2 | | 0.2 |
| Stannous fluoride | | | 0.4 | | 0.4 | |
| Aluminum oxide trihydrate | 5.0 | 10.0 | 5.0 | 5.0 | 2.0 | |
| Aluminum orthophosphate | | | | | 3.0 | 5.0 |
| Ins. sodium metaphosphate | 45.85 | 40.85 | 45.85 | 45.85 | 46.1 | 45.85 |
| Sodium N-lauroyl sarcoside | 2.0 | 2.0 | 2.0 | 2.0 | 2.0 | 2.0 |
| Citric acid | 0.25 | 0.25 | | 0.1 | | 0.25 |
| Glycerine | 13.0 | 20.0 | 29.4 | 29.4 | 29.4 | 29.4 |
| Sorbitol | 20.0 | | | | | |
| Water | 11.2 | 23.8 | 14.4 | 14.4 | 14.4 | 14.65 |
| Irish Moss Gum | 0.65 | 0.9 | | 0.95 | | 0.7 |
| Sodium carboxymethyl-cellulose | | | 0.9 | | 0.8 | | the balance of the formulations being small amounts of preservative, saccharine, color and flavor. These dental creams have a pH from 5.5 to 6.0. They exhibit satisfactory stability during aging.

*Examples VII and VIII.—Tooth Powders*

| Ingredients | VII | VIII |
|---|---|---|
| Insoluble sodium metaphosphate | 80.35 | 82.95 |
| Aluminum orthophosphate | | 10.4 |
| Aluminum oxide trihydrate | 13.0 | |
| Sodium N-lauroyl sarcoside | 4.0 | 4.0 |
| Soluble saccharin | 0.15 | 0.15 |
| Flavor | 2.5 | 2.5 |
| | 100.00 | 100.00 |

Although the present invention has been described with reference to particular embodiments and examples, it will be apparent to these skilled in the art that variations and modifications to this invention can be made and equivalents can be substituted therefor without departing from the principles and true spirit of the invention.

Having thus described the invention, what is claimed is:

1. A dentifrice preparation comprising a fluoride compound which releases fluoride ions in water, and as a polishing material a mixture of a major proportion of insoluble sodium metaphosphate with a minor proportion of an aluminum compound, said aluminum compound inhibiting the dissolving action of said insoluble sodium metaphosphate upon calcium-containing tooth-enamel, said dentifrice being free from calcium salts and similar materials which tend to diminish the effectiveness of the fluoride compound.

2. A dentifrice preparation comprising a fluoride compound which releases fluoride ions in water, and as a polishing material a mixture of a major proportion of an insoluble alkali metal metaphosphate and a minor proportion of an aluminum compound, said dentifrice being free from calcium and magnesium compounds which tend to diminish the effectiveness of the fluoride compound.

3. A dentifrice preparation comprising up to about 2% by weight of a fluoride compound which releases fluoride ions in water and as a polishing material a mixture of a major proportion of insoluble sodium metaphosphate and a minor proportion of aluminum phosphate, said dentifrice being free from calcium and magnesium compounds which tend to diminish the effectiveness of the fluoride compound.

4. A dentifrice preparation comprising up to about

2% by weight of a fluoride compound which releases fluoride ions in water and as a polishing material a mixture of a major proportion of insoluble sodium metaphosphate and a minor proportion of hydrated aluminum oxide, said dentifrice being free from calcium and magnesium compounds which tend to diminish the effectiveness of the fluoride compound.

5. A dental cream comprising insoluble sodium metaphosphate as a polishing agent suspended in a gel comprising water, humectant and gelling agent, about 0.05 to 2% by weight of a fluoride compound which releases fluoride ions in water, an organic non-soap synthetic detergent, and a minor amount of an insoluble inorganic aluminum compound, the ratio of said insoluble metaphosphate to said aluminum compound being from about 100:1 to about 3:2 by weight, said dental cream having a pH from about 5 to 6.5 and being free from calcium and magnesium compounds which tend to diminish the effectiveness of the fluoride compound.

6. A dental cream in accordance with claim 5 in which said aluminum compound is hydrated aluminum oxide.

7. A dental cream in accordance with claim 5 in which said aluminum compound is an aluminum phosphate.

8. A dental cream in accordance with claim 5 in which said fluoride compound is sodium fluoride.

9. A dental cream in accordance with claim 5 in which said fluoride compound is stannous fluoride.

10. A dental cream in accordance with claim 5 which contains about 40–50% of insoluble sodium metaphosphate, and about ½ to 10% of the aluminum compound by weight of the dental cream.

11. A dental cream comprising about 20 to 75% of a mixture of insoluble sodium metaphosphate and an aluminum compound in a ratio from about 50:1 to 4:1 by weight, about 10 to 40% of water and 10 to 40% of humectant, and about 0.05 to 1% of a fluoride compound which releases fluoride ions in water, said dental cream being free from calcium and magnesium compounds which tend to diminish the effectiveness of the fluoride compound, said amounts being by weight of the dental cream.

12. A dental cream in accordance with claim 11 in which said fluoride compound is stannous fluoride in an amount of about 0.4% by weight.

References Cited in the file of this patent

UNITED STATES PATENTS

| | | |
|---|---|---|
| 2,588,324 | Lewis et al. | Mar. 4, 1952 |
| 2,689,170 | King | Sept. 14, 1954 |
| 2,700,012 | Merckel et al. | Jan. 18, 1955 |

FOREIGN PATENTS

| | | |
|---|---|---|
| 633,845 | Great Britain | Dec. 30, 1949 |
| 158,717 | Australia | Sept. 9, 1954 |